United States Patent Office 3,285,322
Patented Nov. 15, 1966

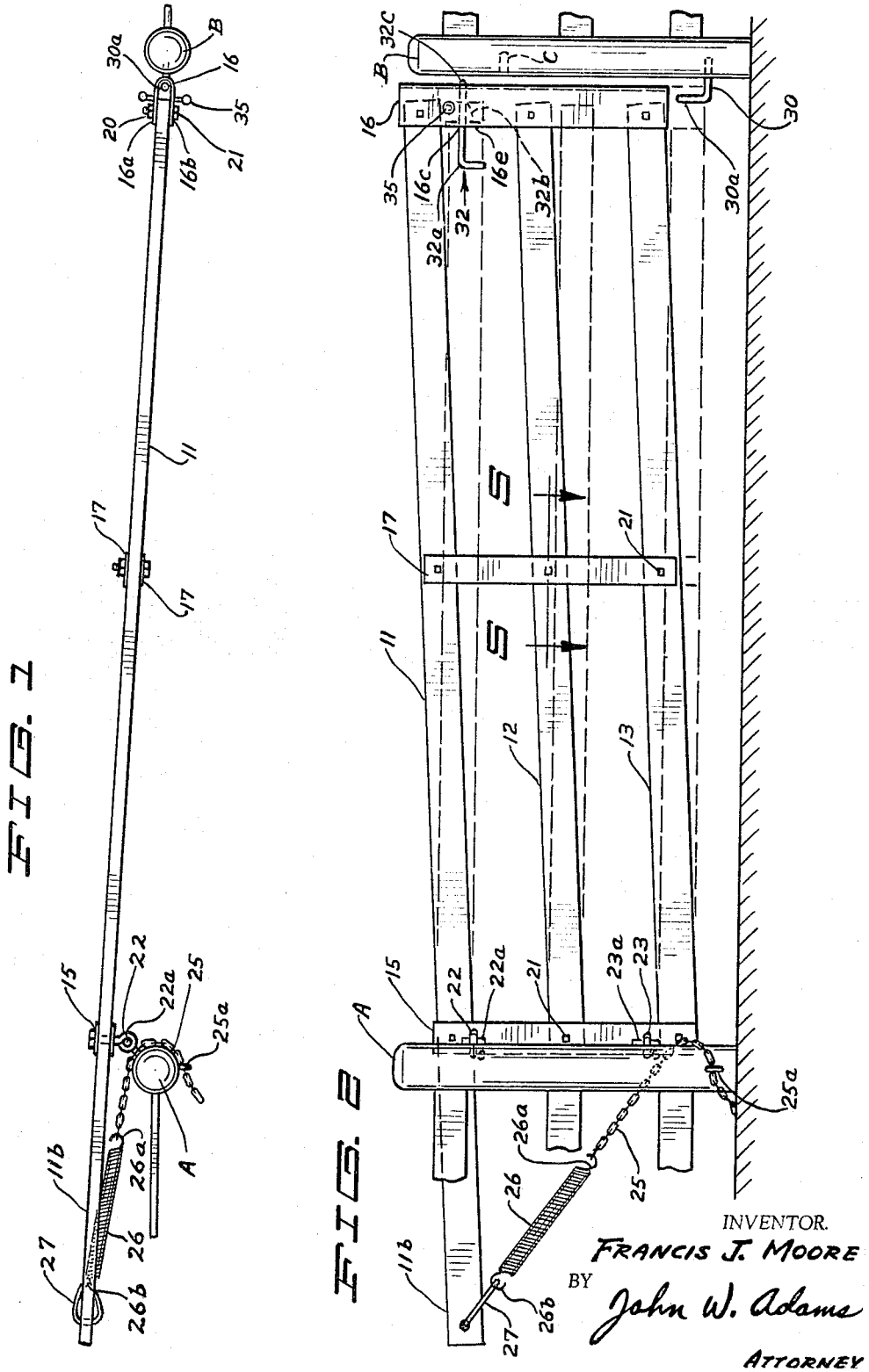

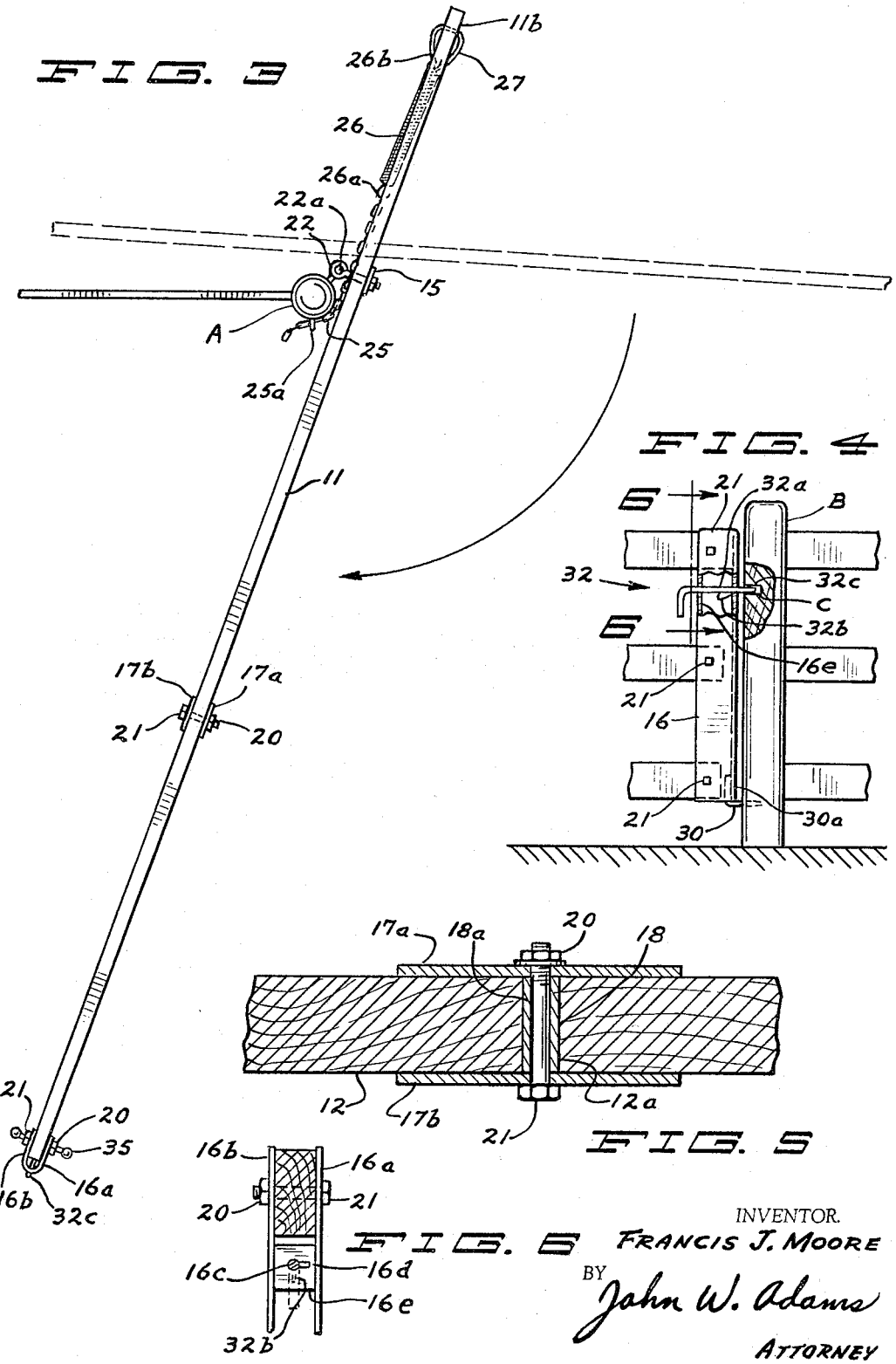

3,285,322
FARM GATE
Francis J. Moore, 4248 Drew Ave. S.,
Minneapolis, Minn.
Continuation of application Ser. No. 272,115, Apr. 10, 1963. This application Feb. 8, 1965, Ser. No. 431,224
2 Claims. (Cl. 160—144)

This invention relates generally to farm gates, and more particularly to a parallelogram-type farm gate adapted to have the free end thereof raised and lowered to conform to irregularities in the ground contour and further for positioning the gate in an open position and is a continuation of application Serial No. 272,115, filed April 10, 1963.

Many gates have been designed which have a free swinging end such that they may pass over irregularities on the ground surface. These gates include wheel members mounted on the free swinging end or support means connected to the free swinging end which are securely fastened at the other end to a king pole at the pivot point of the gate. Difficulties with these methods are that the king pole method requires an extremely strong support member to counteract the weight of the gate and maintain the free end of the gate off the ground whereas the wheeled gate requires somewhat solid ground upon which to operate.

Applicant, however, has provided a parallelogram-type gate which eliminates support means for the free swinging end of the gate and it permits the use of a normal size mounting post for mounting and pivoting the gate.

It is an object of this invention to provide a farm gate of a parallelogram type wherein the free end thereof may be raised to clear irregularities in the contour of the ground surface and having means thereon to counterbalance a substantial portion of the weight of the free end of the gate such that the free end may be easily raised and lowered.

More specifically, it is an object of this invention to provide a farm gate of parallelogram construction having a counterbalancing mechanism thereon supporting a substantial portion of the weight of the free end of the gate and which counterbalancing mechanism is adjustable to facilitate ease of operation of the parallelogram construction, such that the gate may be operated easily by any person.

It is a further specific object of this invention to provide a farm gate having a tensioning device which is responsive to the position of the gate to facilitate positioning the same by exerting an additional counterbalance effect when the gate is closed and relieving the tension when the gate is in open position to permit one end of the gate to be shifted into position to contact the ground and hold the gate in open position.

It is a further specific object of this invention to provide an overcenter swinging means for a farm gate such that when the gate is opened past a predetermined point, it will swing therefrom to a fully opened position.

It is a further specific object of this invention to provide a farm gate having a pair of upright connecting members at the ends thereof wherein the upright member on the free end is arranged to facilitate connection of the gate to an anchoring element when the gate is closed.

It is a further specific object of this invention to provide a farm gate of parallelogram-type construction having a plurality of linkage members which are rotatably connected to frame members by rotative bearing means such that if the gate is made of wood, the wood will not be worn through shifting of the parallelogram construction.

These and other objects and advantages of this invention will more fully appear from the following description made in connection with the accompanying drawings, wherein like reference characters refer to the same or similar parts throughout the several views, and in which:

FIG. 1 is a plan view of the gate in closed position;
FIG. 2 is an elevation view showing the gate in unlatched position and swingable from the anchoring position, and further showing the anchoring position in dotted lines;
FIG. 3 is a plan view showing the farm gate in its fully opened position;
FIG. 4 is a partial section showing the locking element for the gate;
FIG. 5 is a horizontal section taken substantially along line 5—5 of FIG. 2; and
FIG. 6 is a vertical section taken substantially along line 6—6 of FIG. 4.

As illustrated in the accompanying drawings, a partial fence section is shown having a pair of spaced apart fence posts A and B which are constructed to support and anchor the farm gate embodying the concepts of this invention. In the form shown, the farm gate comprises a plurality of substantially parallel cross members 11–12–13 which are pivotally interconnected to a pair of generally vertically arranged end linkage members 15–16 and an intermediate generally vertically arranged linkage member 17.

As illustrated in FIG. 5, the pivotal connection for any of the cross members 11, 12, 13 to the linkage bars 16, 15, 17, which allows the gate to be shifted, is common to all the connective points. For simplicity one such connection is shown wherein cross member 12 is provided with a tubular bearing member 18 pressed therein through an opening 12a transversely across the cross member and clamping means, such as the nut 20 and bolt 21 arrangement, is provided to pass through a central passage 18a in the bearing member 18 and further to pass through opposing linkage bars indicated as 17a-17b which correspond to the central linkage bar 17 as shown in FIG. 1. This arrangement, of course, allows the cross member 12 to pivot about the pivot point formed by the bolt member 21 and allows the rotatability to be governed by the pressure to which the nut 20 is tightened on the bolt 21. By providing this arrangement at all the pivot points, it is obvious that the entire gate may be shifted from a normal rectangular position to that of a parallelogram configuration such that when one end of the gate is fixed, the other end may be raised or lowered in relation thereto such as may be necessary to clear ground obstructions or the like.

In the form shown, a pair of gate mounting eye members 22–23 are arranged on one end of the gate such that the gate may be supported on cooperating hook elements 22a–23a securely fastened into the supporting fence post A. In the form shown the supporting hook members comprise a post A penetrating section and a portion extending generally upward therefrom to pass through the opening in a gate eye member 22–23 and hold the attached gate thereon. As seen in FIG. 1, the support members 22a–23a are arranged in offset relation to the general fence line, the purpose of which will become obvious as the description proceeds.

As shown in FIG. 2, the topmost cross member 11 is substantially longer than the other cross members 12, 13 and extends outwardly from the normal parallelogram of the gate to produce a counterbalancing arm member generally designated 11b. The counterbalancing mechanism is arranged on the extendingmost end of the counterbalancing arm 11b and includes an adjustment member 25 fixedly attached to one end 26a of a tension spring member 26 whose other end 26b is attached to the outer end of the counterbalance arm 11b by the bracket hook member 27. Adjustment member 25 comprises a chain whose links are removably secured to a chain retaining member 25a located near the bottom of the fence support post A. In the form shown the adjustment member circumscribes the fence post A and extends upwardly therefrom to be attached to the tension spring element 26. By providing the adjustment member 25 wrapped partially around the post A, an overcenter action is obtained such that as the gate is swung about the pivot hook members 22a–23a, the resultant of the counterbalancing force applied to the gate varies according to the rotation of the gate such that upon passing a point in its rotation, the spring 26 and linkage chain 25 will swing the gate to a fully opened position. This is also true as the gate swings to a closed position in that after the gate has passed this same point, it will automatically swing shut. The counterbalancing effect of the tension spring member 26 also serves to exert a downwardly directed force upon the outer end 11b of the upper cross bar 11 to relieve a portion of the cantilever weight of the gate and thus facilitate movement thereof in that the operator is not required to lift the full weight of the gate. Further, by providing the force acting on the outer end of the upper cross member 11, the gate is more easily shifted into parallelogram position as again the operator does not have to shift the entire weight of the gate due to the counterbalancing effect.

It should also be obvious that as the gate is swung open into the solid line position as seen in FIG. 3 the effective length of the adjustment member 25 is lengthened with respect to spring member 26 and thus the tension on spring member 26 is substantially reduced. The reduction of this tension permits the free end of the gate to be easily shifted downward to contact the ground and hold the gate in open position.

A closure member is provided on the other end of the gate and in the form shown the linkage member 16 comprises a U-shaped bracket with the arm elements 16a–16b arranged on either side of the cross members 11–12–13 receiving the same into the U portion. In this manner the linkage bar 16 includes an anchoring hook receiving member as an anchoring hook 30 may be arranged on the lower portion of the support post B having one end 30a thereof arranged in a generally vertical position. Upstanding end 30a may be received into the U portion of the bracket 16 as the gate is forced downwardly thereon. This arrangement eliminates any other hook engagement apparatus normally provided at the free end of the gate.

Locking and closure member 32 generally comprises a handle member having a right angled extension 32a thereon which, in the form shown, passes through the linkage member 16 and is receivable into a passage C in the support fence post B. In the form shown, the linkage member 16 is provided with a lock retaining element 16e which, as best shown in FIG. 5, includes a substantially arcuate passage 16c therethrough with an offset slot portion 16d extending radially therefrom. The locking element 32 is provided with a retaining shoulder member 32b which is receivable through the slotted opening 16d of the retaining member 16e but upon rotation thereof the shoulder element 32b will abut with the retainer 16e and hold the same therein. The locking end 32c of the locking element 32 passes through the U-shaped portion of the linkage bar 16 and is extensible therefrom to sufficiently be inserted into the locking passage C of fence post B.

Handle means 35 may be provided on the free swinging end of the gate.

In operation of this gate, the gate is initially mounted upon the support post A with the pivotal and arranged in substantially offset relation to the post A such as by radially offsetting pivots 22a–23a to be on the side of post A opposite the direction to which the gate swings open. The counterbalancing combination of the spring 26 and adjustment chain 25 is also affixed to the post A. As shown in FIGS. 1 and 3, the anchoring element 25a is arranged near the bottom of post A and is circumferentially spaced from mounting hooks 22a–23a at least more than 90° to achieve the proper overcenter and counterbalance relation.

When in closed position, the U-shaped linkage member 16 engages with the anchoring element 30a on the support post B and in this position the locking element 32 may be inserted into the lock opening C of the fence post B.

For opening, the lock 32 is retracted from the lock retaining opening C and the free end of the gate is lifted to the position shown in solid lines in FIG. 2 so as to clear the anchoring element 30 on support post B and is now free to swing therefrom. As the gate swings past a predetermined center position, the overcenter effect of the tension spring 26 causes the gate to swing to a fully opened position. At this point, or wherever desirable, the user may shift the parallelogram position of the gate such that the free swinging end is in contact with the ground, thereby holding the gate in a predetermined position. It is at this point also that the decreased tension on spring 26 due to the increase of the effective length of adjustment member 25 permits ease of shifting the free end of the gate.

To return the gate, the operation is, of course, reversed lifting the gate from the ground and pushing past the overcenter point at which time the tension spring 26 causes the gate to return to approximately the closed position where it may be re-anchored on the support post B.

The adjustability of the linkage chain 25 so as to increase the effective length of the compression spring 26, of course, allows the user to adjust for the weight of the gate to both maintain the free end of the gate off the surface of the ground and further to allow him to more easily shift the gate into parallelogram configuration.

The connective method for the link members and cross members allows free shifting into the parallelogram configuration and further allows adjustability for any wearing of the members should they be produced from wood.

It is obvious applicant has provided a unique and simple farm gate of the parallelogram-type construction which is designed to be long-lasting due to the rotative pivot points of the parallelogram and is easily operable due to the counter-balancing effect provided therein.

It will, of course, be understood that various changes may be made in the form, details, arrangement and proportion of the parts without departing from the scope of my invention, which generally stated consists in the matter set forth in the appended claims.

What I claim is:
1. A gate structure including:
 (a) a plurality of normally vertically arranged linkage members;
 (b) a plurality of normally horizontal members having at least the ends thereof pivotally attached to said linkage members to permit shifting of the joined members from a normally rectangular structure to a parallelogram structure;
  (b1) the uppermost one of said horizontal members being of greater length than the other of said members and arranged to extend outwardly beyond one of said support members to provide a counterbalance arm;
 (c) a pair of spaced post members establishing a plane of closure, one of said post members having gate hanging means thereon arranged offset to said closure plane, the other of said post members provided with means for holding the gate in closed position;
 (d) means on one of said linkage members which linkage member is adjacent the end of the gate underlying the longest of said horizontal members, said means arranged for hanging engagement with said gate hanging means for support of said gate; and (e) a spring member arranged on the outwardly extending end of said counterbalance arm and secured to the lowermost end of the mounting post at a point arcuately spaced around the post from the engaging elements to produce a control balance effect on said gate to facilitate lifting thereof.

2. The structure set forth in claim 1 wherein said spring member is arcuately arranged around said post such that when the gate is swung from the closure plane the tension on said spring will decrease to permit shifting of the gate into the parallelogram position where it may contact the ground and be held thereby.

References Cited by the Examiner

UNITED STATES PATENTS

| | | | |
|---|---|---|---|
| 894,742 | 10/1907 | McVay | 39—82 |
| 999,906 | 8/1911 | Swanson | 39—76 |
| 1,038,854 | 9/1912 | Corcoran | 39—76 |
| 1,051,280 | 1/1913 | Slattery | 39—15 |
| 1,471,830 | 10/1923 | Corey. | |
| 2,582,666 | 1/1952 | Young | 39—61 X |
| 2,724,142 | 11/1955 | McNobb | 39—22 X |
| 2,849,810 | 9/1958 | Voss | 39—18 X |

HARRISON R. MOSELEY, *Primary Examiner.*

D. L. TAYLOR, *Assistant Examiner.*